Patented Mar. 18, 1947

2,417,773

UNITED STATES PATENT OFFICE 2,417,773

ALPHA-SUBSTITUTED ARALKYL ESTERS OF AMINO CARBOXYLIC ACIDS

Henry Martin, Franz Häfliger, and Karl Gätzi, Basel, Switzerland, assignors to the firm J. R. Geigy A. G., Basel, Switzerland No Drawing. Application September 11, 1943, Serial No. 502,032. In Switzerland September 23, 1942

4 Claims. (Cl. 260—247)

The spasmolytic effect of the benzyl alcohol and its esters, for instance of benzyl acetate and benzyl benzoate, is known (Macht, J. Pharmacol. Exp. Therapeutics 9, 197 (1917)). In view of the supposition that the capability of easy saponification of the esters would provoke a strong spasmolyse, benzyl esters of high fatty acids have been synthesized which may more easily be split by lipase than the benzyl esters of aromatic acids (H. Shonle and P. Q. Row, J. Amer. Chem. Soc. 43, 361 (1921)). Mortimer Bye (Ind. Engng. Chem. 13, 217 (1921)) recommends the benzyl succinate because of its non-poisonousness. C. Nielsen and J. Higgins (J. Lab. Clin. Med. 7, 579 (1922)) also are of the opinion that the "benzyl effect" of the esters results from the hydrolytic production of benzyl alcohol. On intravenous injection of benzyl benzoate and cinnamic acid benzyl ester, they have stated a stronger efficiency of the latter.

On the other hand, E. Snapper, Grünbaum and Sturkop (Biochem. Z. 155, 163 (1925)) are of the contrary opinion. They are of the opinion that the efficiency results from the unsplit molecule and recommend the use of the difficultly splittable N-benzyl phthalamidic acid (Klin. Wschr. 4, I, 389, 1925) which is obtainable in the trade in form of suitable salts. An analogous compound is the N-benzylmalonamidic acid.

Moreover, the following compounds have been proposed: the cholic acid benzyl ester, the benzyl esters of high molecular fatty acids (J. Amer. Chem. Soc. 43, 361 (1921)) and the citric acid benzyl ester.

All these compounds are characterized by a spasmolytic musculotropic efficiency of the papaverine; a neurotropic, atropine-like efficacy is missed. The same is the case for comparable benzyl ether compounds, among which for example the acetobromopyrocatechine benzyl ether has become known.

It has now been found that basic esters of aralkyl alcohols which are substituted in α-position by at least one hydrocarbon radical possess a manifest atropine-like efficiency. Like atropine the new compounds show a considerable antispasmodic efficacy, especially for the smooth muscular system of the intestines. When using the new compounds, the mostly undesirable by-effects of the atropine are diminished or also completely missed. Such an efficacy could not have been foreseen, as heretofore such a neurotropic-like efficiency has become known only for basic substituted esters and amides of hydroxy acid derivatives, such as for example of tropic acid, amygdalic acid, atroglycerinic acid, benzilic acid, o- and m-hydroxybenzoic acid or corresponding derivatives of benzoic acid, phenyl acetic acid and hydrogenation products thereof.

Beside the atropine-like effect the new basic esters of α-substituted aralkyl alcohols develop also a manifest papaverine-like efficiency and show still strong anesthetic and partly also manifest bactericidal properties. The corresponding quaternary compounds have a similar behaviour.

The basic esters of α-substituted aralkyl alcohols may be prepared according to various methods. Thus, for example, reactive esters of α-substituted benzyl alcohols, e. g. the halides, can be interacted with salts of aliphatic amino acids disubstituted at the nitrogen atom or ordinary, e. g. aliphatic amino acid esters may be esterified by means of α-substituted benzyl alcohols. Moreover, it is also possible to cause metal compounds of α-substituted benzyl alcohols to react with basic substituted reactive aliphatic acids.

A further possibility of production consists in that α-substituted aralkyl alcohols are esterified with carboxylic acids which, instead of the amino group required according to the definition, possess a substituent being directly or indirectly replaceable by the amino group, such as for example the hydroxy group or halogen, and in that the disubstituted amino group is subsequently introduced. For this purpose it is advantageous to cause α-substituted aralkyl alcohols or salts thereof to react with aliphatic, acylated hydroxy acid halides or aliphatic halogen carboxylic acid halides in presence or absence of diluents, to replace the hydroxyl groups possibly present in the resulting compounds by hagolen and finally introducing the amino group.

Of course, instead of introducing directly the disubstituted amino group, it is also possible to effect the reaction in an indirect manner by introducing primary or secondary amino groups, which for instance also can intermediarily be substituted by acyl radicals, and then subsequently producing the desired N-substitution in the usual manner.

As α-substituted aralkyl alcohols are to be understood secondary and tertiary alcohols such as for instance may be obtained by substitution of the CH₂-group of the benzyl alcohol. These substituents may for example be of aliphatic, araliphatic, hydroaromatic or aromatic nature. Secondary α-substituted benzyl alcohols can for instance be produced by catalytic reduction of the corresponding aryl alkyl ketones.

Secondary alcohols may also be recovered according to Grignard by interaction of suitable halides with aldehydes. By the analogous interaction with aliphatic, araliphatic or cycloaliphatic ketones there result tertiary substituted aralkyl alcohols. Moreover, the α-substituted aralkyl alcohols may often preferably be substituted in the nucleus, for instance by halogen atoms or by alkoxy groups or they may contain several aromatic nuclei which may be condensed with each other.

By addition of alkyl halides, alkylene halides, aryl sulfonic acid esters, dialkyl sulfates, aralkyl halides and so on, there are obtained in the usual manner quaternary ammonium compounds from the α-substituted basic aralkyl esters.

The new compounds may be used as therapeutics.

In order to fully understand the present invention, the same may now be illustrated by the following examples without being limited thereto, the parts being by weight, unless otherwise stated.

Example 1

A mixture of 12 parts of the silver salt of β-diethylamino propionic acid and 10 parts of α-bromo-n-butyl benzene in 100 parts of absolute alcohol is heated for 6 hours under reflux, then the alcohol is removed in vacuo and the residue dissolved in diluted hydrochloric acid. After filtration, the solution is extracted with ether, the aqueous layer then filtered and, while cooling with ice, made alkaline by means of potassium carbonate. The free base is then extracted from this solution by means of ether, the ethereal solution washed with concentrated potassium carbonate solution, dried and evaporated. The final product distils at 12 mm. pressure at 170°–171° C.

Example 2

To a mixture of 20 parts of n-propyl-p-methylphenyl carbinol and 10 parts of absolute pyridine in 100 parts of absolute ether, 21 parts of β-bromopropionic acid chloride are added dropwise, while stirring and cooling with ice-water. Then the mixture is heated for 1 hour under reflux; after allowing the mixture to cool down, water is added and the whole is extracted with ether. The ether solution is washed with a cold diluted sodium carbonate solution, then dried and evaporated. The residue, the β-bromopropionic acid-(n-propyl-p-methyl phenyl carbine-)-ester, boils at a pressure of 0.2 mm. at 117°–122° C.

18 parts of this bromide are treated with 20 parts of diethylamine while cooling and then heated under reflux for 2 hours at 70°–80° C. After the addition of water and diluted hydrochloric acid until the solution has been made acid to Congo, the whole is shaken out with ether. Then the acid solution is made alkaline in the cold by means of potassium carbonate and the free base is finally extracted with ether. B. P. $_{0.1\,mm}$ 121°–128° C.; yield 13 parts.

The carbinol is obtained by interaction of p-toluyl aldehyde with a n-propyl magnesium bromide solution in absolute ether, B. P. $_{12\,mm.}$ 110°–116° C.

Example 3

By causing 22.1 parts of β-bromopropionic acid chloride to react with a solution of 23 parts of n-propyl-3:4-dimethylphenyl carbinol and 11 parts of absolute pyridine in 150 parts of absolute ether the β-bromopropionic acid-(-n-propyl-3:4-dimethyl phenyl carbine-)-ester is obtained which boils at 127°–129° C., at a pressure of 0.1 mm. 6 parts of this bromide and 4 parts of diethylamine are heated together for 2 hours at 60°–70° C. The base is obtained by treating the mixture with diluted acid, etherising and precipitating from the aqueous solution. It boils at 125°–128° C. at 0.05 mm. pressure; the yield amounts to 4 parts.

The above β-bromopropionic acid ester can also be interacted with ammonia or ethylamine and subsequently be ethylated, for instance with diethyl sulfate; thus it is also possible to alkylate the product up to the quaternary stage.

Example 4

17.5 parts of β-bromopropionic acid chloride are added dropwise at 5°–10° C. and under cooling to a mixture of 20 parts of n-propyl-α-naphthyl carbinol and 8 parts of absolute pyridine in 100 parts of absolute ether. After heating for 1 hour under reflux water is added and the mixture is etherised. The ether solution is then washed with a cold sodium carbonate solution and evaporated, the residue being β-bromopropionic acid-(n-propyl-α-naphthyl carbine-)-ester, B. P. $_{0.1\,mm.}$ 155°–162° C.

9 parts of this bromide are treated, while cooling, with 10 parts of diethylamine and then heated for 2 hours on the water-bath. The reaction product is dissolved in water and diluted acid, shaken out with ether and the base freed from the acid solution by means of a cold potassium carbonate solution. It distils at 167°–171° C. at 0.1 mm. pressure.

Example 5

17.1 parts of β-bromopropionic acid chloride are allowed to drop at 5°–10° C. into a solution of 18.4 parts of n-propyl-p-chlorophenyl carbinol and 16 parts of absolute pyridine in 100 parts of absolute ether and subsequently heated for 1 hour under reflux. From the reaction product the β-bromo-propionic acid-(n-propyl-p-chlorophenyl carbine-)-ester is isolated by the addition of water and by washing the ethereal solution with a diluted cold sodium carbonate solution. B. P. $_{0.1\,mm.}$ 128°–131° C. 9 parts of this bromide and 6 parts of diethylamine are heated for 2 hours to 60°–70° C. The base is obtained by treating the mixture with diluted hydrochloric acid, shaking with ether and saturating the aqueous solution by means of a cold potassium carbonate solution. B. P. $_{0.1\,mm.}$ 121°–124° C.

When using dimethyl-, dipropyl-, dibutylamine and so on, very similar final products are obtained.

Example 6

While stirring and cooling to 5°–10° C., 8.5 parts of β-bromopropionic acid chloride are allowed to drop into a solution of 8.2 parts of isobutyl phenyl carbinol and 7.9 parts of absolute pyridine in 100 parts of absolute ether and the interaction is completed by heating the mixture for one hour to 40° C. Water is then added, the ethereal solution is washed with a diluted sodium carbonate solution and finally evaporated. The residue is heated under reflux for 1 hour with about 8 parts of diethylamine. After completion of the reaction the mixture is treated with diluted acid, etherised and the base is freed from the aqueous cold solution by means of an alkali. The base which is obtained by extraction with ether boils at a pressure of 0.8 mm. at 138°–140° C. Yield 6 parts.

Instead of diethylamine, dimethylamine may also be used; B. P. $_{1.2\,mm.}$ 138°–140° C.

Example 7

17 parts of chloroacetyl chloride are added dropwise and under cooling to 0°–5° C. to a solution of 24.6 parts of isobutyl phenyl carbinol and 24 parts of absolute pyridine in 150 parts of absolute ether, whereupon the whole is heated for 1 hour to 40° C. After the addition of water the ethereal solution is washed by means of a bicarbonate solution and evaporated. The isobutyl phenyl carbine chloroacetate boils at 145°–148° C. at 12 mm. pressure. 5 parts of this compound are heated for 1 hour to 70°–80° C. with 5 parts of diethylamine. The base is then isolated therefrom in the usual manner. B. P. $_{12\,mm.}$ 162°–164° C.; yield 4 parts.

Example 8

While cooling with ice, 8.5 parts of β-bromopropionic acid chloride are added dropwise to a solution of 9.6 parts of isobutyl-3:4-dimethyl phenyl carbinol and 8 parts of absolute pyridine in 100 parts of absolute ether and the whole is heated for 1 hour on the water-bath. After having added water thereto the ethereal solution is washed with a cold diluted sodium carbonate solution and evaporated. The ether residue is heated with 10 parts of diethylamine for 2 hours at 70°–80° C. under reflux. The reaction product is treated with diluted acid, etherised and the base make free in the cold by means of a potassium carbonate solution and collected in ether, B. P. $_{0.15\,mm.}$ 140°–142° C. Yield 8 parts.

The carbinol is obtained by the interaction of equimolecular quantities of 3:4-dimethyl benzaldehyde with an ethereal isobutyl magnesium bromide solution. B. P. $_{12\,mm.}$ 125°–134° C.

In an analogous manner, when using n-butyl-3:4-dimethyl phenyl carbinol, prepared from n-butyl magnesium bromide and 3:4-dimethyl benzaldehyde, B. P. $_{15\,mm.}$ 145°–152° C., β-bromopropionic acid - (n - butyl - 3:4-dimethylphenyl carbine-)-ester, B. P. $_{0.3\,mm.}$ 141°–143° C., and from the latter the β-diethylamino propionic acid ester boiling at 132°–136° C. at 0.1 mm. pressure are obtained.

Example 9

While stirring and cooling with ice-water, a solution of 195 parts of β-bromopropionic acid chloride in 900 parts of absolute ether is allowed to drop into a mixture of 210 parts of cyclohexyl phenyl carbinol and 110 parts of absolute pyridine in 900 parts of absolute ether. After having heated this mixture for 2 hours on the water-bath, it is treated with water, then the ethereal solution is washed with diluted bicarbonate solution and evaporated. The β-bromopropionic acid-(cyclohexyl phenyl carbine-)-ester boils at 139°–142° C. at 0.1 mm. pressure. The raw ether residue is added dropwise and under cooling to 20° C. to a solution of 150 parts of diethylamine in 300 parts of absolute ether and then treated for 3 hours on the water-bath. After having added much water, the mixture is acidified and etherised. The aqueous solution is made alkaline in the cold by means of a caustic lye and the base thus separated dissolved in an organic solvent. The residue is stirred into 1 liter of 2-n hydrochloric acid; after a short time the hydrochloride crystallises in form of fine needles melting at 192°–194° C. Yield 180 parts. The free base boils at 151°–156° C. at 0.03 mm. pressure.

In exactly the same manner the corresponding β-diethylaminopropionic acid ester, B. P. $_{0.2\,mm.}$ 165° C., is produced, when using cyclohexyl-p-methylphenyl carbinol, B. P. $_{0.1\,mm.}$ 131°–135° C., prepared according to Grignard from p-toluyl aldehyde and cyclohexyl magnesium bromide.

The above examples only represent some possibilities of the combinations of the various constituents, carbinol, acid and amine. The following table shows a further summary of the different constituents which can be combined together in any way, the designations having been chosen according to the following formula

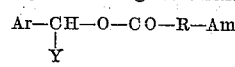

| Ar | Y | R | Am |
|---|---|---|---|
| Cl—⬡—Cl | CH$_3$— | —CH$_2$—CH$_2$—CH$_2$— | —N(CH$_3$)(CH$_3$) |
| Br—⬡— | C$_2$H$_5$— | | —N(CH$_3$)(C$_2$H$_5$) |
| CH$_3$O—⬡— | (CH$_3$)$_2$CH— | | —N(CH$_2$—CH=CH$_2$)(CH$_2$—CH=CH$_2$) |
| (CH$_3$)$_2$CH—⬡— | (CH$_3$)(CH$_3$)CH—CH$_2$—CH$_2$— | | —N(CH$_2$—CH$_2$)(CH$_2$—CH$_2$)O |
| ⬡—O—⬡— | ⬡—CH$_2$— | | —N(CH$_2$—CH$_2$)(CH$_2$—CH$_2$)N—CH$_3$ |
| | (CH$_3$)(CH$_3$)⬡—CH$_2$— | | |

| Ar | Y | R | Am |
|---|---|---|---|
| 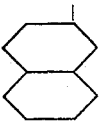 |  | | 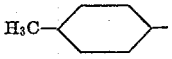 |

Thus, by suitable selection and combination of components as set forth in the previous description, it is possible to produce, among others, the basic ester of the formula

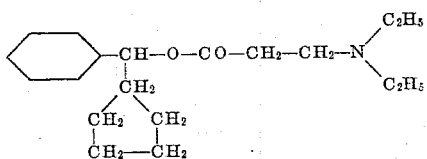

which is a colorless liquid of the B. P. 149°–151° C. at 0.4 mm. pressure, and possesses valuable therapeutic properties.

What we claim is:

1. The basic ester of the formula

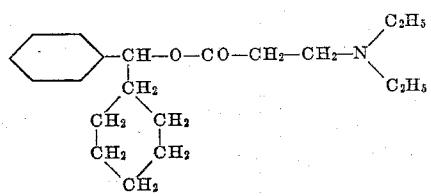

being a colorless liquid of the B. P. 151°–156° C. at 0.03 mm. pressure, possessing valuable therapeutic properties.

2. The basic ester of the formula

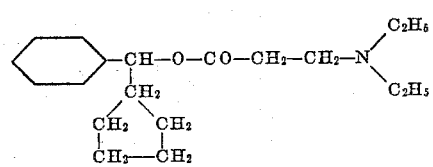

being a colorless liquid of the B. P. 148°–151° C. at 0.4 mm. pressure, possessing valuable therapeutic properties.

3. The basic ester of the formula

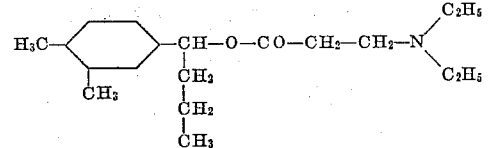

being a colorless liquid of the B. P. 125°–128° C. at 0.05 mm. pressure, possessing valuable therapeutic properties.

4. A basic ester of the formula

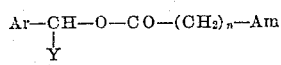

wherein Ar stands for a member selected from the group consisting of the phenyl, p-methylphenyl, 3:4-dimethylphenyl, p-isopropylphenyl and naphthyl, Y stands for a member selected from the group consisting of alkyl containing at most five carbon atoms and cycloalkyl, $n$ is one of the integers 1 and 2, and Am represents a member selected from the group consisting of N=(lower alkyl)$_2$, piperidyl and morpholinyl, wherein "lower alkyl" represents an alkyl group containing at most three carbon atoms.

HENRY MARTIN.
FRANZ HÄFLIGER.
KARL GÄTZI.

REFERENCES CITED

The following references are of record in the file of this patent:

FOREIGN PATENTS

| Number | Country | Date |
|---|---|---|
| 629,054 | German | Apr. 22, 1936 |
| 462,967 | British | Mar. 10, 1937 |
| 543,556 | German | Feb. 6, 1932 |
| 537,450 | German | Nov. 3, 1931 |

OTHER REFERENCES

Weil, Chemical Abstracts, vol. 18 (1924), p. 2325.